United States Patent
Dolansky et al.

(10) Patent No.: US 7,421,307 B2
(45) Date of Patent: Sep. 2, 2008

(54) OPERATING METHOD AND APPARATUS FOR CONTROLLING A MACHINE TOOL

(75) Inventors: Stefan Dolansky, Altdorf (DE); Thomas Menzel, Bubenreuth (DE); Gernot Rossi, Simmelsdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/598,902

(22) Filed: Sep. 14, 2006

(65) Prior Publication Data

US 2007/0150089 A1 Jun. 28, 2007

(30) Foreign Application Priority Data

Mar. 19, 2004 (DE) .................. 10 2004 013 615

(51) Int. Cl.
*G06F 19/00* (2006.01)

(52) U.S. Cl. .................. 700/159; 700/86; 700/160

(58) Field of Classification Search .......... 700/159, 700/160, 169, 170, 172, 178, 179, 191, 195; 173/4; 235/380; 340/10.51; 483/15; 712/200–207, 712/230, 231; 714/765
See application file for complete search history.

(56) References Cited

U.S. PATENT DOCUMENTS

| | | | |
|---|---|---|---|
| 4,288,849 A * | 9/1981 | Yoshida et al. ............. 700/3 |
| 4,646,245 A * | 2/1987 | Prodel et al. ............... 700/113 |
| 4,742,470 A * | 5/1988 | Juengel ...................... 700/175 |
| 4,823,255 A * | 4/1989 | Tanaka et al. ............... 700/86 |
| 4,831,540 A * | 5/1989 | Hesser ........................ 700/113 |
| 5,109,973 A | 5/1992 | Hirano et al. |
| 5,189,624 A * | 2/1993 | Barlow et al. .............. 700/169 |
| 5,241,160 A * | 8/1993 | Bashan et al. .............. 235/380 |
| 5,247,452 A | 9/1993 | Ueda et al. |
| 5,315,524 A * | 5/1994 | Seki et al. .................... 700/183 |
| 5,374,231 A | 12/1994 | Obrist et al. |
| 5,401,229 A | 3/1995 | Otsuka et al. |
| 5,929,778 A * | 7/1999 | Asama et al. ............. 340/10.51 |
| 2001/0052416 A1* | 12/2001 | Wissmach et al. ............. 173/4 |
| 2003/0023337 A1 | 1/2003 | Godfrey et al. |
| 2003/0120897 A1* | 6/2003 | Schlansker ................. 712/200 |

FOREIGN PATENT DOCUMENTS

| | | |
|---|---|---|
| DE | 100 29 133 A1 | 1/2002 |
| EP | 0 927 600 | 7/1999 |
| WO | WO 01/82009 | 11/2001 |

* cited by examiner

*Primary Examiner*—Paul L Rodriguez
*Assistant Examiner*—Carlos Ortiz Rodriguez
(74) *Attorney, Agent, or Firm*—Henry M. Feiereisen

(57) ABSTRACT

The invention relates to a control device (5), controlling a machine tool (1), which processes a step sequence (S1-S11), by a wireless reading of a partial program (18) from a workpiece data support (15), provided for a workpiece (3) and processing the workpiece (3), following the downloaded partial program (18).

24 Claims, 4 Drawing Sheets

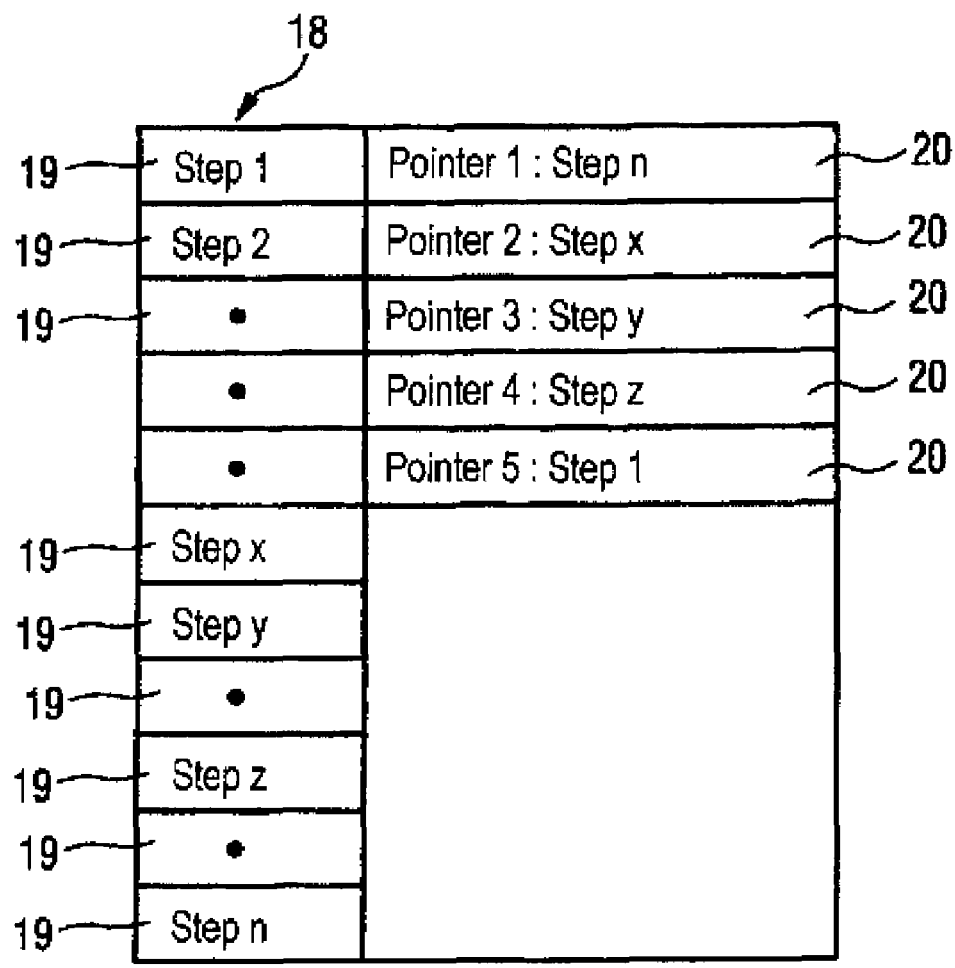

OPERATING METHOD AND APPARATUS FOR CONTROLLING A MACHINE TOOL

BACKGROUND OF THE INVENTION

The present invention relates to an operating method for a machine tool controlled by a control device, wherein the control device processes a step sequence.

The present invention additionally relates to a program data carrier having an operating program stored on the program data carrier for performing such an operating method. It further relates to a workpiece data carrier having a transponder which is operatively connected to a memory.

Such operating methods are generally known. With such methods, the control device is usually programmed by the manufacturer of the control device or the manufacturer of the machine tool to perform specific machining of a workpiece. As part of said programming, among other things the control device is also parameterized, that is to say specified in accordance with the actual configuration of the machine tool.

From WO-A-01/82009 it is known to provide tools on woodworking machines with transponders so that it is possible to insure that specific machining operations are only executed using the correct tool. It is also disclosed in WO-A-01/82009 that transponders may contain memories, with status information being stored in the memory and the status information being updated following each machining operation. Finally, it is further disclosed in WO-A-01/82009 that, in the case of circuit board production, the circuit board or a container with components for the circuit board to be produced has a transponder containing a placement program for the placement machine, which then assembles the circuit board.

The object of the present invention is to create an operating method for a machine tool controlled by a control device and also the corresponding objects by means of which the programming and/or parameterization of the machine tool and also a monitoring of operation can be realized as simply as possible.

SUMMARY OF THE INVENTION

In accordance with one aspect of the invention, a machine tool has a control device that is adapted to process a step sequence and means for wirelessly reading out at least one part program from a work piece data carrier assigned to a work piece while processing the step sequence. The machine tool machines that work piece in accordance with the part program that was read out by the control device.

Since the machine tool reads out at least one part program from a workpiece data carrier assigned to the workpiece and machines the workpiece in accordance with the part program read out, each workpiece carries its own machining instruction with it, so to speak. The workpiece can therefore be fed—without prior corresponding programming of the machine tool—to any machine tool that is basically suitable.

If the part program has a number of individual steps to be sequentially executed, the control device also reads out from the workpiece data carrier a program pointer assigned to the workpiece, the control device begins executing the individual steps with an individual step indicated by the program pointer and, on ending execution of the part program, the control device transmits a new program pointer to the workpiece data carrier so that the program pointer stored in the workpiece data carrier is updated, then in particular it is possible to interrupt machining operations of workpieces at virtually any time and resume them at a later time. Machining may be resumed here either with the same or with another machine tool.

A particularly memory-efficient and time-efficient procedure is obtained for series production if a plurality of identical workpieces that are to be machined identically are assigned to the workpiece data carrier and the control device reads out the part program for all workpieces only once from the workpiece data carrier.

If the control device also reads out a description of the workpiece from the workpiece data carrier, the procedure according to the invention is even more flexible.

The description read out may include, for instance, the original geometric dimensions of the workpiece and/or the current geometric dimensions of the workpiece immediately prior to the workpiece being machined by the machine tool. It is then in particular possible for the control device to take account of the geometric dimensions of the workpiece as part of a collision check.

The description of the workpiece preferably also includes information about the workpiece material. It is then possible for instance for the control device to measure the actual power input of drives of the machine tool during workpiece machining and compare it with threshold values, adjust the further machining of the workpiece and detect tool breakage if the actual power input exceeds the threshold values, and adjust at least one of the threshold values depending on the information about the workpiece material. It is also possible for the control device to adjust a machining rate at which it machines the workpiece depending on the material information.

If the control device also reads out a workpiece identifier from the workpiece data carrier, it is insured that the correct workpiece is machined using the control program assigned to it.

The data stored in the workpiece data carrier may furthermore include a description of machining that has already been performed on the workpiece. It is consequently possible for the control device to trace the history of the workpiece, should this be necessary. The description of the machining already performed may contain for instance identification of the machine being used, identification of its operator, machining times (start, end, duration), quality information and resource information. The quality information may here include, for example, information about normal processes (e.g. the machines and tools used as well as measurement data) and/or about abnormal processes (e.g. process errors, tool breakage, extraordinary user interventions or other notable occurrences).

Finally, the control device can also read out a description of a minimum requirements profile. On the basis of said information, by comparing it with the capabilities of the machine tool, the control device can then decide whether it is possible to perform the desired machining on this machine tool.

The operating method according to the invention can be designed in an even more flexible manner if, during processing of the step sequence, the control device wirelessly reads out component data from a component data carrier assigned to an additional component of the machine tool and takes it into account when processing the step sequence.

For instance, in this case it is possible for the component data to contain geometric dimensions of the additional component and for the control device to take account of the component dimensions for collision checking. Alternatively or additionally, it is also possible for the component data to include status data such as operating hours and wear as well as the type and number of machining operations, and for the control device to transmit updated values of said status data to the component data carrier once the workpiece has been machined.

It is furthermore possible for the control device also to transmit a machine tool identifier and/or a user identifier to the component data carrier.

BRIEF DESCRIPTION OF THE DRAWING

Further advantages and details emerge from the description of an exemplary embodiment below in conjunction with the drawings. In a basic diagram in each case, FIG. 1 schematically illustrates a device arrangement having, inter alia, one machine tool, FIG. 5 shows a section from FIG. 3.

DETAILED DESCRIPTION OF PREFERRED EMBODIMENTS

Figure 1:
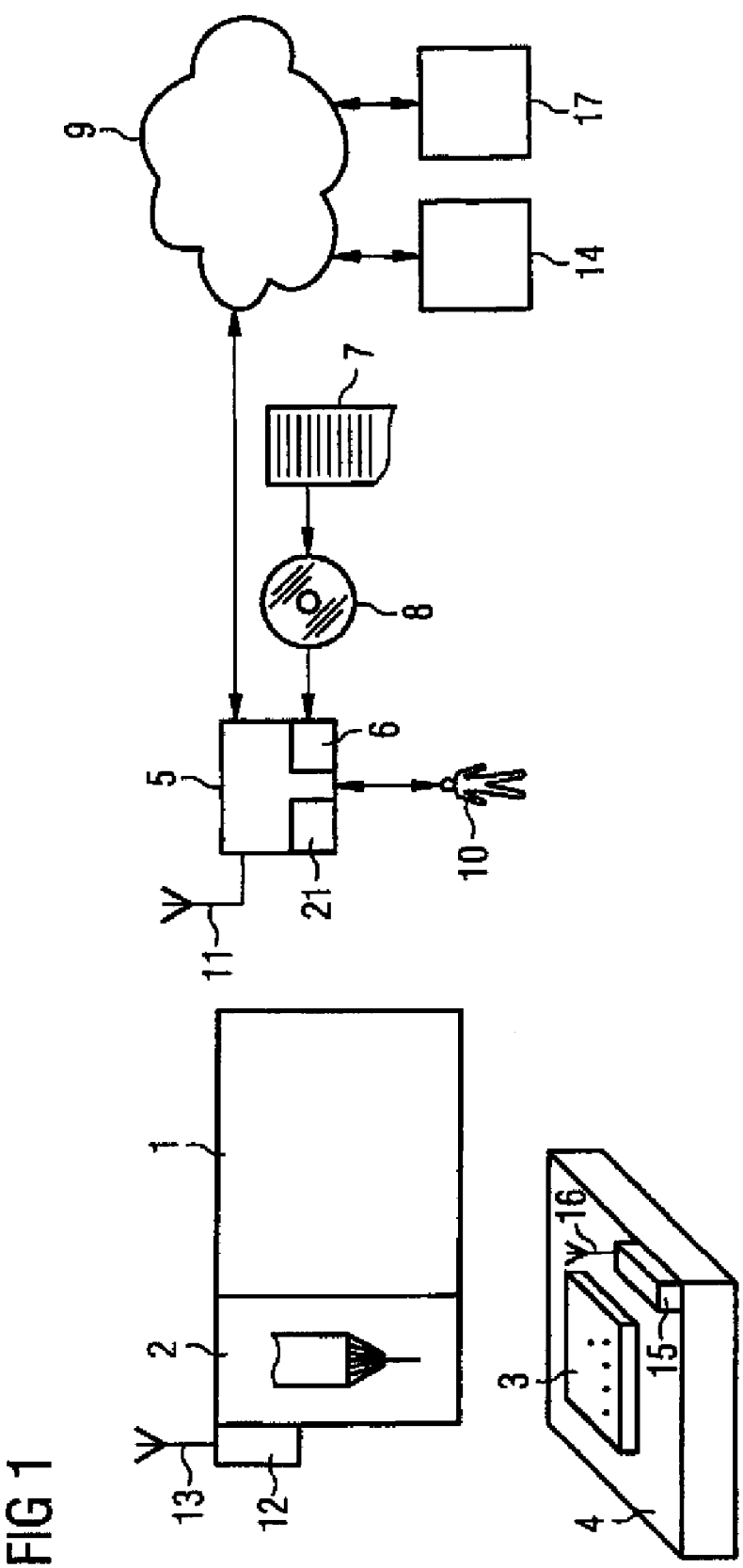

According to FIG. 1, a device arrangement has inter alia a machine tool 1, for example a pillar drilling machine 1. The machine tool 1 has at least one additional component 2 which is detachably connected to the machine tool 1, for example a motorized opening and closing drill chuck 2. A workpiece 3, which is held in a workpiece fixture 4 for example, can be machined by means of the machine tool 1 and the additional component 2. By virtue of the exemplary design of the machine tool 1 as a pillar drilling machine 1, in the present case the machining naturally comprises the drilling of holes in the workpiece 3.

The machine tool 1 is controlled by a control device 5. The control device 5 is designed, for example, as a numerical controller 5. It has a program memory 6 in which an operating program 7 is stored. The operating program 7 can have been supplied here to the control device 5 via, for instance, a program data carrier 8 on which the operating program 7 is stored. One example of such a program data carrier 8 is a CD-ROM 8. The data carrier 8 could however also be designed as a memory card for example. Alternatively, it is also possible to supply the operating program 7 to the control device 5 from another computer via a computer-to-computer connection 9. Examples of such computer-to-computer connections 9 are a local area network (LAN), e.g. an Ethernet, or the Internet (world wide web).

When the operating program 7 is called—for example as a result of a corresponding input by an operator 10—the control device 5 executes an operating procedure which will be described in greater detail below with reference to FIG. 2.

Figure 2:
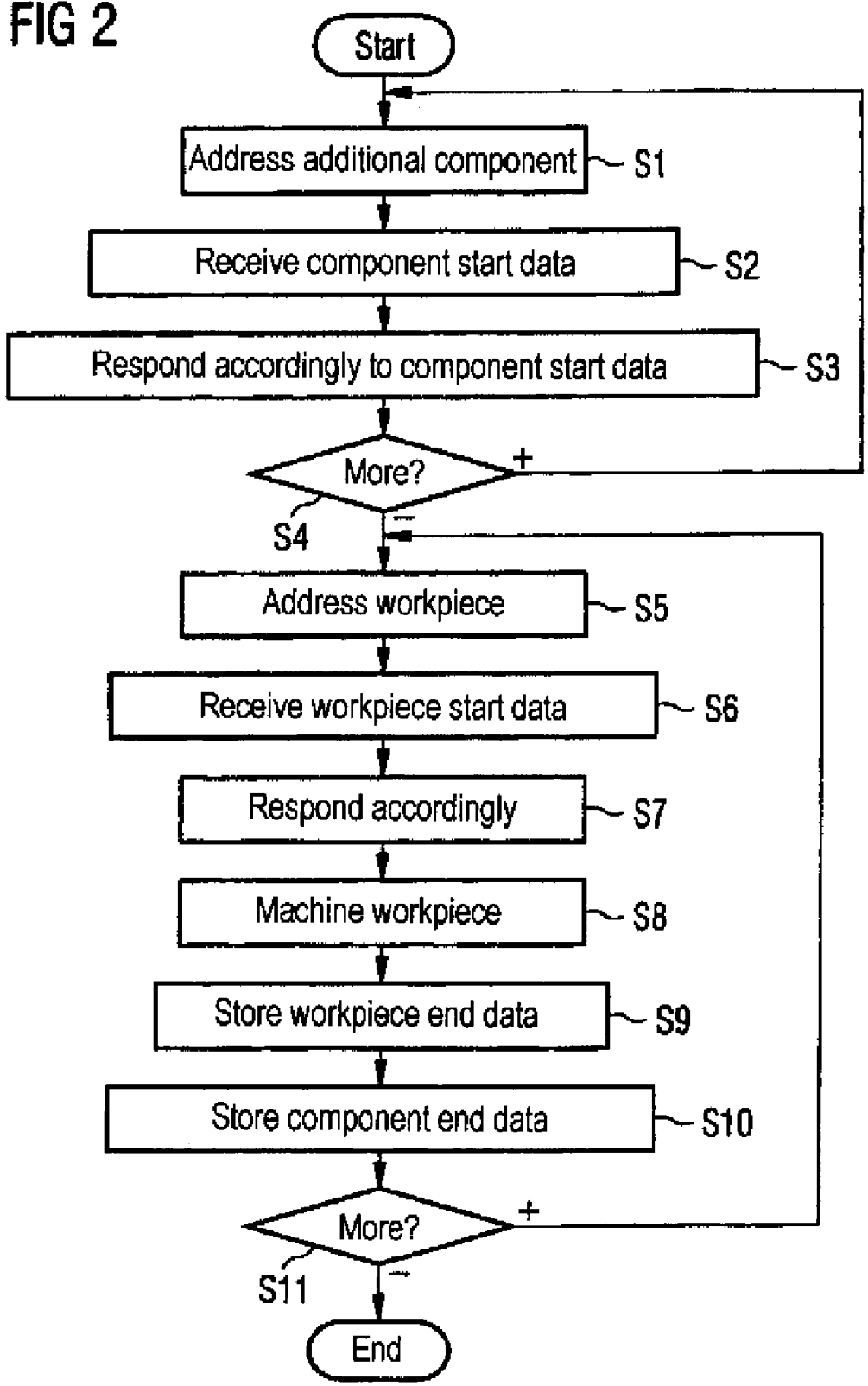
FIG. 2 shows a flowchart.

According to FIG. 2, when executing the operating program 7, the control device processes a step sequence comprising steps S1 to S11. In particular the steps S3 and S7 to S10 comprise here in turn a multiplicity of individual steps, which are however not shown in greater detail in FIG. 2.

According to FIG. 2, in step S1 the control device 5 first addresses the additional component 2. For this it emits—see FIG. 1—via an antenna 11 a radio frequency signal having a transmitting frequency. By means of the radio frequency signal, a component data carrier 12 is wirelessly supplied with power from the control device 5. The component data carrier 12 thus draws the power from the radio frequency signal emitted by the control device 5. As a result of drawing the power from the radio frequency signal emitted from the antenna 11, the component data carrier 12 is automatically supplied with power from the control device 5 only during communication between the control device 5 and the component data carrier 12.

As a rule, the component data carrier 12 is designed as a transponder 12. It is assigned to the additional component 2, for example connected thereto in a fixed and non-detachable manner. Alternatively, it is also possible for the component data carrier 12 to be detachably connected to the additional component 2. It may be detachable here with or without a tool. It is furthermore also possible—depending on the type of additional component 2 in each case—for the component data carrier 12 to be loosely connected to the additional component 2, for instance by means of a flexible band.

As a result of being addressed by the control device 5, the component data carrier 12 transmits component start data to the control device 5. The component start data is transmitted here via an antenna 13 of the component data carrier 12 to the control device 5. The component start data is therefore also transmitted wirelessly.

The component data carrier 12 sends the component start data on a—from the point of view of the control device 5—receiving frequency. For this purpose it modulates the radio frequency signal emitted by it. The control device 5 receives the transmitted data in step S2.

Figure 3:
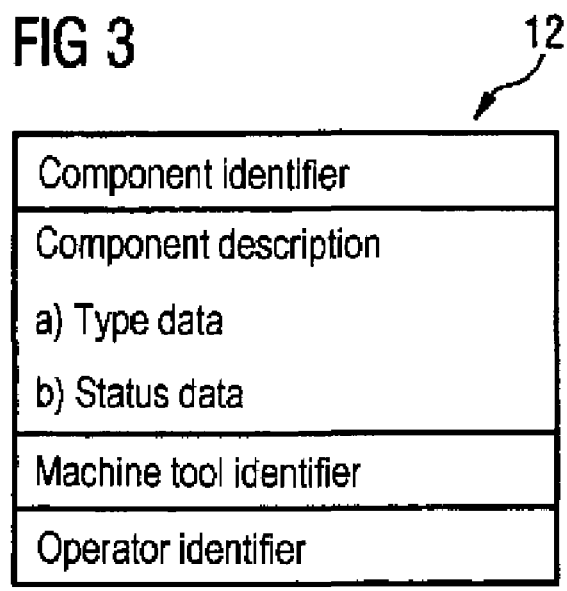
FIG. 3 shows the contents of a component data carrier.

The component start data can include—see FIG. 3—different data. It preferably includes at least one component identifier by means of which the additional component 2 can be differentiated from all other additional components—even identically designed additional components. It furthermore preferably includes a component description.

The component description preferably includes—again see FIG. 3—type data and status data. The type data is the design data of the additional component 2, for example its geometric dimensions, the minimum and maximum diameter of a drill bit that can be inserted into the drill chuck 2, and the like. The status data may include, for example, the current status of the additional component 2, for instance whether a drill bit is inserted in the drill chuck 2 or not, how wide the drill chuck 2 is currently open, etc. The status data may further include also the operating history of the additional component 2, for example the number of operating hours, the date of last servicing, wear information, or for example also the type and number of machining operations executed with the respective additional component 2.

After receiving the component start data, the control device 5 responds accordingly in step S3. The control device 5 preferably directly parameterizes itself in step S3 in accordance with the component start data transmitted.

As part of the further processing of the step sequence, the control device 5 thus takes account of the transmitted component start data in that the control device 5 parameterizes itself in accordance with the actual component start data, and accordingly takes said parameterization into account during processing of the step sequence, in particular as part of steps S7 and S8.

Apart from the additional component 2, it is possible for further additional components to be present. After executing step S3, in step S4 the control device 5 therefore checks whether further additional components could still be present. If this is the case, it returns to step S1. Otherwise, processing of the step sequence is continued with step S5.

Two ways, which can be employed either alternatively or cumulatively, are possible here for the targeted addressing of only one additional component 2 in each case. On the one hand it is possible to address the individual additional components 2 by means of different transmitting frequencies. On the other hand it is possible to modulate the—if applicable respective—transmitting frequency at the control device 5 end, so that the additional components 2 can identify from the modulation whether they are being addressed or not.

In step S5 the control device 5 addresses a workpiece data carrier 15. For this it emits—again see FIG. 1—via the antenna 11 a radio frequency signal having a transmitting frequency. The transmitting frequency may be the same transmitting frequency as used for addressing the additional component 2. However, it is preferably different from the transmitting frequency for addressing the component data carrier 12.

By means of the signal now emitted, the workpiece data carrier 15 is wirelessly supplied with power from the control device 5. Power is therefore only supplied during communication between the control device 5 and the workpiece data carrier 15. The workpiece data carrier 15 here draws the power from the signal transmitted from the antenna 11.

Like the component data carrier 12, the workpiece data carrier 15 is preferably designed as a transponder. It is assigned to the workpiece 3. It may be arranged here either on the workpiece 3 itself or on the workpiece fixture 4, or else on another transport unit for the workpiece 3, for example a pallet. It may be arranged detachably or non-detachably on the mechanical component bearing it. In the case of a detachable arrangement, it may be detached with or without a tool. A loose connection, for example by means of a flexible band, is again also possible.

As a result of being addressed by the control device 5, the workpiece data carrier 15 transmits workpiece start data to the control device 5. The workpiece start data is transmitted here via an antenna 16 of the workpiece data carrier to the control device 5. The control device 5 receives the transmitted workpiece start data in step S6.

The workpiece data carrier 15 sends the workpiece start data on a—again from the point of view of the control device 5—receiving frequency. The receiving frequency may again be identical to the receiving frequency for the data transmission from the component data carrier 12 to the control device 5. However, it is preferably different from this frequency.

For data transmission, the workpiece data carrier 15 modulates the radio frequency signal emitted by it so that the control device 5 can receive the transmitted data by means of corresponding demodulation.

As already mentioned, it is possible for the workpiece data carrier 15 to be addressed on the same transmitting frequency as the component data carrier(s) 12. In this case it is also necessary to modulate the transmit signal emitted by the control device 5 accordingly so that the workpiece data carrier 15 can be addressed specifically.

Figure 4:
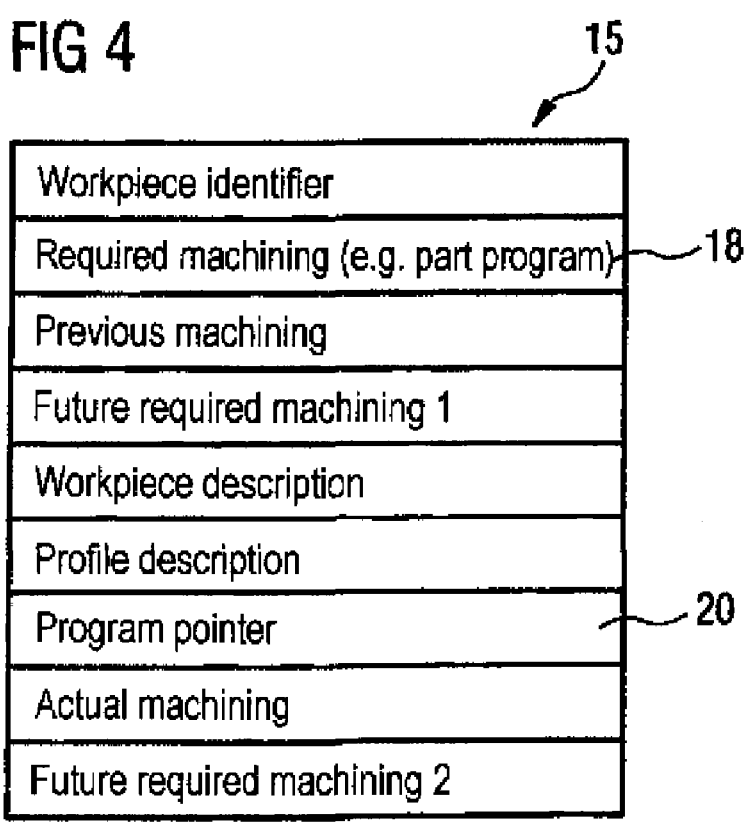
FIG. 4 shows the contents of a workpiece data carrier.

Analogously to the component start data, the workpiece start data may include—see FIG. 4—different data. However, it should at least include a workpiece identifier, that is to say an identifier by means of which the respective workpiece 3 can be differentiated from other—even identical—workpieces.

The workpiece start data may further include a description of a minimum requirements profile for the machine tool 1. On the basis of said minimum requirements profile, the control device 5 is then able to check itself whether the machine tool 1 is at all capable of executing the desired machining. The minimum requirements profile can include, for example, that the drill holes are to be drilled in different planes, that is to say the drill chuck 2 must be capable of supporting 2-dimensional positioning. Depending on the capabilities of the machine tool 1, whether it can position the drill chuck 2 in only one dimension or in two dimensions for example, the control device 5 can therefore accept machining of the workpiece 3 or—with output of a corresponding message to the operator 10—refuse it.

The workpiece start data may for instance further include a description of machining of the workpiece 3 required to be executed by the machine tool 1. One example of such required machining is a part program 18 conforming to DIN 66025. Such a part program 18 naturally has—see FIG. 5—a number of individual steps 19 that must be sequentially executed by the control device 5 for the correct machining of the workpiece 3. In this case, so to speak, each workpiece 3 is assigned its own machining instruction directly and immediately.

The description of the required machining may include further information, for instance information about machining times, a desired machining quality and use of resources, for instance water cooling during drilling.

The workpiece start data output by the control device 5 preferably also includes a program pointer 20. When read out, the program pointer 20 points to the individual step 19 to be executed next. The control device 5 thus commences executing the part program 18 with the individual step 19 indicated by the program pointer 20.

During execution of the part program 18, the control device 5 internally updates a program pointer 21. The program pointer 21 points in each case to the individual step 19 currently being executed. When the control device 5 ends execution of the part program 18, it transmits the value of its internal program pointer 21 to the workpiece data carrier 15. The latter can thus update the program pointer 20.

As can further be seen from FIG. 5, the memory of the workpiece data carrier 15 contains only a single part program 18, but a plurality of program pointers 20. The reason for this is that a plurality of workpieces 3 may be assigned to the workpiece data carrier 15, with the workpieces 3 all being identical and to be machined identically. In such a case, the part program 18 need therefore only be present once, and also need only be read out once from the workpiece data carrier 15. The program pointers 20 are individually assigned in each case to a single workpiece 3 in a proprietary manner. For the workpieces 3 are also machined independently of one another by the machine tool 1. Machining is usually performed sequentially.

It is also possible for the workpiece start data to include a description of machining that has already been performed on the workpiece 3. In particular, this information may include a machine tool identifier, an operator identifier, machining times (start, end, duration), quality information and resource information. In this case the history of the workpiece 3 is therefore likewise made known to the control device 5.

The workpiece start data may furthermore include a description of further machining required which is to be performed on the workpiece 3 by another device following machining by the machine tool 1. This information may again include machining times, a desired machining quality and resources to be used.

Finally, the workpiece start data may also include a description of the workpiece 3 before machining by the machine tool 1. For instance, CAD data that describes the dimensions of the workpiece 3 may be transmitted. The workpiece description read out preferably includes both original dimensions of the workpiece 3 and current dimensions of the workpiece 3 immediately prior to machining of the workpiece 3 by the machine tool 1. The original and/or the current geometric dimensions of the workpiece 3 can then be taken into account by the control device 5, in particular as part of a collision check. Where the data read out—see above—from the component data carrier 12 includes geometric dimensions of the additional component 2, this data is of course also taken into account during the collision check.

Depending on the type and extent of machining of the workpiece 3 by the machine tool 1, the current dimensions of the workpiece 3 may change. Where necessary, therefore, following the end of machining of the workpiece 3, the control device 5 transmits updated dimensions to the workpiece data carrier 15.

The description of the workpiece 3 may furthermore also include material information (wood, copper, aluminum, steel, hardness etc.). The control device 5 can use this information, for instance, to adjust a machining rate at which the machine tool 1 machines the workpiece 3 depending on the material information.

During normal machining of the workpiece 3 by the machine tool 1, the drives of the machine tool 1 have an essentially predeterminable power consumption. In the case of tool breakage, on the other hand, the power consumption (or power input) of the corresponding drives increases sharply. The control device 5 can therefore record the actual power input of the drives of the machine tool 1 and compare it with suitably determined threshold values. If the actual power input of the drives exceeds the threshold values, the control device 5 detects tool breakage. In this case it can adjust the further machining of the workpiece 3.

The power input of the drives during normal machining of the workpiece 3—that is to say without tool breakage—greatly depends on the material of the workpiece 3. The control device 5 therefore preferably adjusts the threshold values depending on the material information read out from the workpiece data carrier 15.

As a result of the transmitted workpiece start data, the control device 5 is able to take account of this data during further processing of the step sequence. In this case, the control device 5 takes the workpiece start data into account as such in steps S7 and S8, in particular during machining of the workpiece in step S8.

Once step S7 has been executed—and also step S8 in the case where the workpiece 3 is machined by the machine tool 1 in step S8—step S9 is executed. In step S9, the results of machining the workpiece 3, insofar as they relate to the workpiece 3, are stored. For this, said results are transmitted wirelessly as workpiece end data to the workpiece data carrier 15 in step S9. Transmission to the workpiece data carrier 15 is performed here completely analogously to the transmission of the workpiece start data in steps S5 and S6.

The workpiece end data can again include—see in particular FIG. 4—different data. It preferably includes at least a description of the machining actually executed on the workpiece 3 by the machine tool 1. The description may include for instance machining times (start, end, duration), the machine tool identifier, the operator identifier, operator interventions during machining of the workpiece 3, quality information and resource information.

The workpiece end data preferably also includes a description of a required machining of the workpiece 3 still to be performed, which is to be performed by a device other than the machine tool 1. This description may again include, for instance, machining times, quality information and resource information.

Analogously, after step S9, the results of machining the workpiece 3, insofar as they relate to the additional component 2, are stored in step S10. Transmission to the component data carrier 12 is of course again performed wirelessly.

The component end data preferably also includes a machine tool identifier and an operator identifier. It may furthermore include status data of the additional component 2, for instance its setting, its operating hours, information about the type and number of machining operations executed with the additional component 2, wear information, as well as any special information such as overheating etc.

Finally, following step S10, in step S11 it is established whether a further workpiece 3 is waiting to be machined. If so, a jump is made back to step S5, otherwise processing of the step sequence is terminated.

By virtue of the mode of operation of the machine tool 1 according to the invention, therefore, a highly flexible operation of the machine tool 1 which can be individually tailored to the additional component 2 and the workpiece 3 is insured in a simple manner.

What is claimed is:

1. An operating method for a machine tool for machining a workpiece in sequentially executed machining steps, the method comprising the steps of:
    wirelessly reading out at least one part program from a workpiece data carrier assigned to the workpiece, wherein the at least one part program includes a program pointer;
    reading out the program pointer assigned to the workpiece;
    beginning execution of the at least one part program at a step indicated by the program pointer;
    transmitting a new program pointer to the workpiece data carrier when execution of the step of the at least one part program ends and updating the program pointer with the new program pointer; and
    controlling the machine tool so that the machine tool machines the workpiece in accordance with said at least one part program.

2. The operating method of claim 1, wherein a plurality of identical workpieces to be machined identically are assigned to said workpiece data carrier and said at least one part program is wirelessly read out from said workpiece data carrier only once for said plurality of identical workpieces.

3. The operating method of claim 1, said method further comprising the step of transmitting updated component data to said component data carrier after the workpiece has been machined, said component data including at least one of the following: a machine tool identifier, a user identifier, selling of the additional component and overheating of the additional component.

4. The operating method of claim 1, further comprising the step of wirelessly reading out a description of the workpiece from said workpiece data carrier so that the machine tool machines the workpiece in accordance with said description of the workpiece.

5. The operating method of claim 4, wherein said description includes original geometric dimensions of the workpiece.

6. The operating method of claim 4, wherein said description includes geometric dimensions of the workpiece immediately prior to machining of the workpiece by the machine tool.

7. The operating method of claim 4 wherein said description includes geometric dimensions of the workpiece, said method further including the step of taking account of said geometric dimensions of the workpiece in a collision check.

8. The operating method of claim 4, wherein said description of the workpiece includes a workpiece identifier, said method further comprising the steps of wirelessly reading out a workpiece identifier from said workpiece data carrier; and determining whether said workpiece identifier is a correct workpiece identifier for said at least one part program.

9. The operating method of claim 4, wherein said description of the workpiece includes a minimum requirements profile, said method further comprising the steps of comparing said minimum requirements profile with capabilities of the machine tool; and commencing machining the workpiece only if said capabilities of the machine tool match said minimum requirements profile.

10. The operating method of claim 4, wherein said description of the workpiece includes information about a material of the workpiece.

11. The operating method of claim 10 wherein the machine tool has drives, and further comprising the steps of measuring actual power input by a drive during machining of the workpiece; comparing the actual power measured with threshold power values; adjusting the further machining of the workpiece in accordance with said comparison; and adjusting at least one of said threshold power values depending on said information about the material of the workpiece.

12. The operating method of claim 11, further comprising the step of detecting tool breakage if said actual power input exceeds a threshold value for said material.

13. The operating method of claim 11, further comprising the step of adjusting a machining rate at which the workpiece is machined if said actual power input exceeds a threshold value for said material.

14. The operating method of claim 1, further comprising the steps of wirelessly reading out component data from a component data carrier assigned to an additional component of the machine tool during processing of said sequentially executed machining steps; and taking said component data into account in processing said step sequence.

15. The operating method of claim 14, wherein said component data includes geometric dimensions of said additional component, said method further comprising the step of taking account of said dimensions of the additional component in a collision check.

16. The operating method of claim 14, wherein said component data includes status data, and further comprising the step of transmitting updated status data to said component data carrier after the workpiece has been machined.

17. The operating method of claim 16, wherein said status data includes at least one of the following: operating hours, wear, type of machining operations and number of machining operations.

18. A machine tool for machining a workpiece, comprising:
a control device adapted to control the machine tool, said control device being adapted to process a step sequence; and
means for wirelessly reading out at least one part program from a workpiece data carrier assigned to the workpiece during the processing of said step sequence to supply said at least one part program to the control device so that the machine tool machines the workpiece in accordance with said at least one part program,
wherein said at least one part program includes individual steps, the individual steps being adapted to be sequentially executed, said machine tool further comprising:
means for wirelessly reading out a program pointer assigned to the workpiece from said workpiece data carrier;
means for beginning execution of said at least one part program at an individual step indicated by the program pointer; and
means for transmitting a new program pointer to the workpiece data carrier when execution of said at least one part program ends, so that the new program pointer updates the program pointer stored in the workpiece data carrier.

19. The machine tool of claim 18, further comprising means for reading out said at least one part program only once from said workpiece data carrier for a plurality of identical workpieces to be machined identically, said plurality of identical workpieces being assigned to said workpiece data carrier.

20. The machine tool of claim 18, further comprising means for reading a workpiece identifier from said workpiece data carrier; and means for determining whether said workpiece identifier is a correct workpiece identifier for said at least one part program.

21. The machine tool of claim 18, further comprising means for wirelessly reading out component data from a component data carrier assigned to an additional component of the machine tool; means for using said component data when processing said step sequence; and means for transmitting updated component data to said component data carrier after the workpiece has been machined.

22. The machine tool of claim 18, further comprising means for reading a description of the workpiece from said workpiece data carrier.

23. The machine tool of claim 22, wherein said description includes geometric dimensions of the workpiece.

24. The machine tool of claim 22 wherein said description includes information about a material of the workpiece.

* * * * *